United States Patent
Connelly

(10) Patent No.: US 7,266,498 B1
(45) Date of Patent: Sep. 4, 2007

(54) METHOD AND APPARATUS FOR REDUCING CONFLICTS BETWEEN SPEECH-ENABLED APPLICATIONS SHARING SPEECH MENU

(75) Inventor: Jay H. Connelly, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1038 days.

(21) Appl. No.: 09/216,457

(22) Filed: Dec. 18, 1998

(51) Int. Cl.
*G10L 21/00* (2006.01)
(52) U.S. Cl. .................................... 704/270
(58) Field of Classification Search ............. 704/270, 704/275, 243, 244, 239, 240, 251
See application file for complete search history.

(56) References Cited

U.S. PATENT DOCUMENTS

| | | | | |
|---|---|---|---|---|
| 4,275,266 A | * | 6/1981 | Lasar | 367/198 |
| 4,972,485 A | * | 11/1990 | Dautrich et al. | 704/251 |
| 5,386,494 A | * | 1/1995 | White | 704/275 |
| 5,452,397 A | * | 9/1995 | Ittycheriah et al. | 704/240 |
| 5,471,557 A | * | 11/1995 | Chung et al. | 704/232 |
| 5,737,723 A | * | 4/1998 | Riley et al. | 704/243 |
| 5,754,977 A | * | 5/1998 | Gardner et al. | 704/243 |
| 5,987,411 A | * | 11/1999 | Petroni et al. | 704/255 |
| 6,052,666 A | * | 4/2000 | Diehl et al. | 704/275 |
| 6,119,088 A | * | 9/2000 | Ciluffo | 704/275 |
| 6,134,527 A | * | 10/2000 | Meunier et al. | 704/239 |
| 6,185,530 B1 | * | 2/2001 | Ittycheriah et al. | 704/255 |

\* cited by examiner

*Primary Examiner*—Angela Armstrong
(74) *Attorney, Agent, or Firm*—Kenyon & Kenyon LLP

(57) ABSTRACT

Method and apparatus are provided for developing a speech menu which is adapted to store a plurality of sound commands for a speech-enabled application. A first sound command of the plurality of sound commands is compared to a second sound command to determine an accuracy value. If the accuracy value is less than a predetermined value, then at least one of the first sound command and the second sound command is replaced with a third sound command.

18 Claims, 3 Drawing Sheets

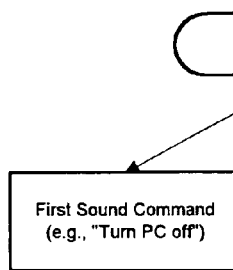
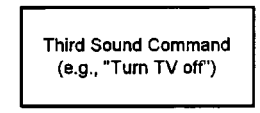
Figure 2a
Figure 2b
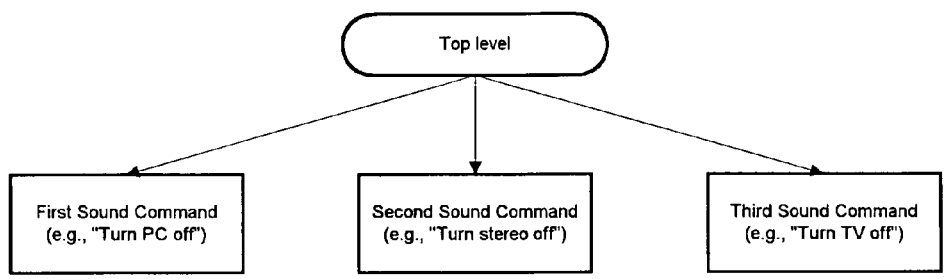
Figure 3
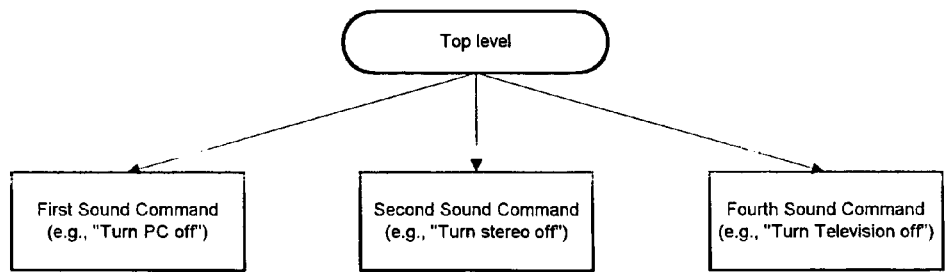
Figure 5

METHOD AND APPARATUS FOR REDUCING CONFLICTS BETWEEN SPEECH-ENABLED APPLICATIONS SHARING SPEECH MENU

FIELD OF INVENTION

The present invention relates to a method and apparatus for reducing conflicts between speech enabled applications sharing a speech menu.

BACKGROUND OF THE INVENTION

In conventional systems, a number of electronic devices can be controlled using a Speech-Enabled Application ("SEA") which is executed using a computer. In addition, a plurality of SEAs may exist in a particular electronic device (e.g., a Consumer Electronic ("CE") device such as a stereo system and a television set). Each command of the electronic device has a corresponding plurality of sound commands grouped together in a speech menu. A user, after activating a particular SEA device, issues a sound command (i.e., a word, phrase or tone). SEA matches the sound command to a corresponding execution command. Such matching is performed using tables or databases of SEA where the sound command and the execution command are stored. Then, the execution command is sent to a processor of the electronic device for execution.

There are several standards for constructing the speech menu of SEA. For example, Microsoft® Speech API ("Application Program Interface" or "SAPI") (Microsoft Corporation, Redmond, Wash.) and Novel® Speech Recognition API ("SRAPI") (Novel Corporation, Ottawa, Canada) are two common standards for constructing the speech menu.

Conventionally, the speech menus are professionally created by independent software vendors ("ISVs") and they are typically static (i.e., they cannot be adjusted by the user; only the ISVs can modify them). A problem arises when the user is attempting to use simultaneously a number of SEAs that have different associated speech menus (e.g., these speech menus are not inter-operable). A conflict may arise between SEAs attempting to share different speech menus. This problem occurs due to the nature of SEA and the speech menu, and their ability to distinguish one word, phrase or tone accurately from another. Thus, there is a need for improved inter-operability between different SEAs.

SUMMARY OF THE INVENTION

An embodiment of the present invention provides for a method and apparatus for developing a speech menu which is adapted to store a plurality of sound commands for a speech-enabled application. A first sound command of the plurality of sound commands is compared to a second sound command to determine an accuracy value. If the accuracy value is less than a predetermined value, then at least one of the first sound command and the second sound command is replaced with a third sound command.

BRIEF DESCRIPTION OF THE DRAWINGS

FIG. 2*a* shows a first exemplary speech menu having two recognizable sound commands.

FIG. 2*b* shows a second exemplary speech menu having one recognizable sound command.

FIG. 3 shows a third speech menu which combines the first and second menus of FIGS. 2*a*-2*b*.

FIG. 5 shows a final speech menu after an exemplary operation of the distance accuracy application.

DETAILED DESCRIPTION OF THE INVENTION

According to an exemplary embodiment of the present invention, diverse, independent SEAs are enabled to share efficiently a common speech menu. Such sharing (discussed in detail below) is achieved by measuring the quality of each sound command in speech menus and by using a quality metric procedure to determine an acceptable sound command. For instance, the sound command may include (1) a vocal command issued by, e.g., a human or robot, or (2) a tone command issued, e.g., a tone-producing apparatus, such as a telephone.

The quality of the sound command is determined by analyzing the likelihood that one word, phrase or tone (e.g., the sound command) of the speech menu will be incorrectly interpreted as another word, phrase or tone of the speech menu. The method according to an exemplary embodiment of the present invention provides a distance accuracy application that determines the most optimal sound command based on other active SEAs.

Figure 1:
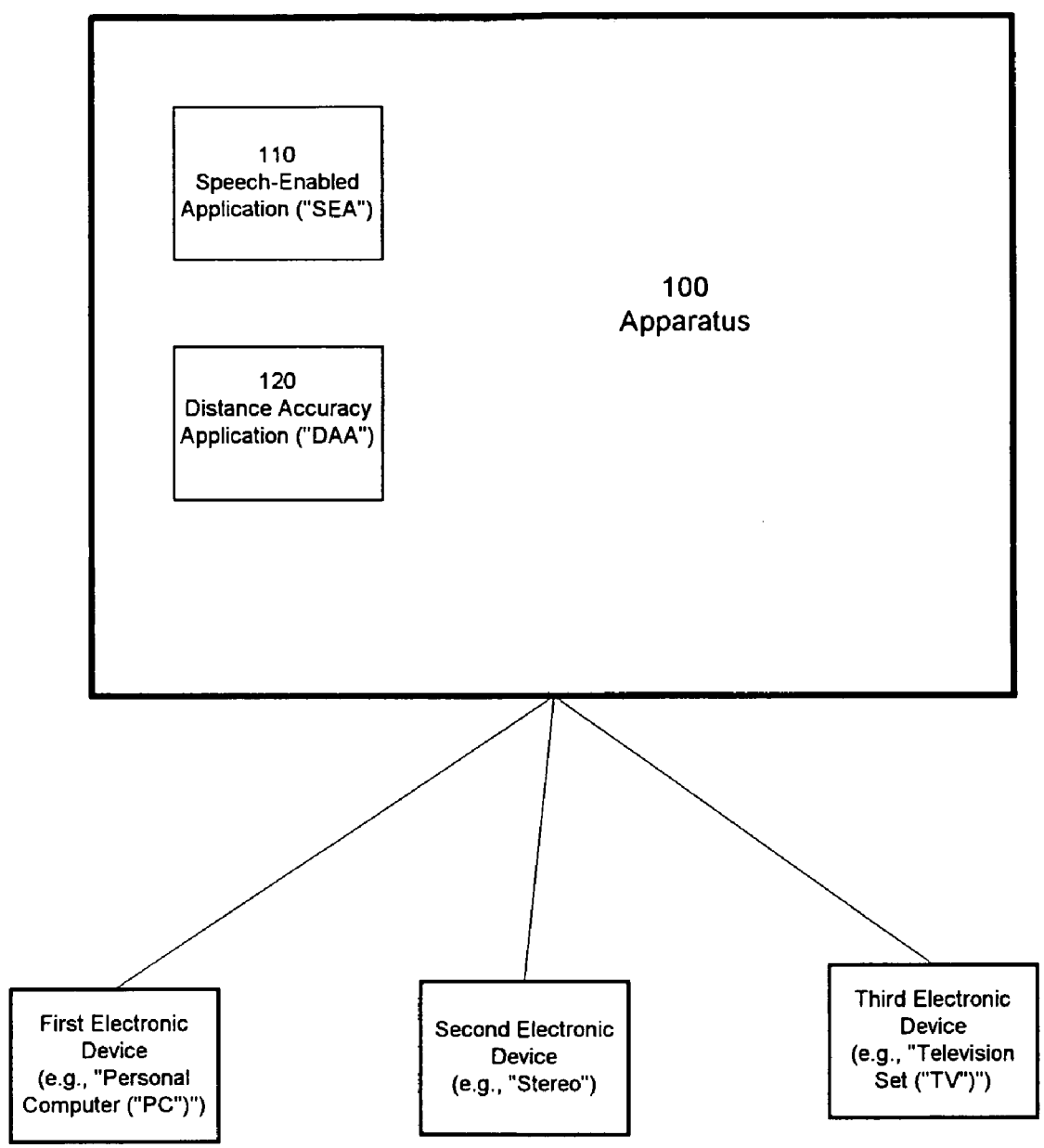
FIG. 1 shows an exemplary embodiment of an apparatus including a distance accuracy application according to an embodiment of the present invention.

FIG. 1 shows an apparatus 100 (e.g., a computer including a processor executing code, such as a Pentium II® processor, Intel Corporation, Santa Clara, Calif.) executing a Speech-Enabled Application 110 ("SEA") and a Distance Accuracy Application 120 ("DAA"). Although DAA 120 of FIG. 1 can work with different standards, in this exemplary embodiment, DAA 120 is being used in a SAPI implementation. SEA 110 and DAA 120 may be stored in, e.g., a memory arrangement, a processor, a microphone, and a speaker.

Apparatus 100 can be coupled to at least one electronic device using, e.g., a serial connection, a parallel connection, a dedicated card connection, an internet connection, a wireless connection, etc. Execution of SEA 110 by apparatus 100 controls a first electronic device (e.g., a personal computer ("PC")) and a second electronic device (e.g., a stereo). As shown in FIG. 2*a*, SEA 110 stores a first speech menu which has a top level. The top level allows the user to issue sound commands, e.g., a first sound command (e.g., "Turn PC off") or a second sound command (e.g., "Turn stereo off").

The user may also connect a further electronic device to apparatus 100 (e.g., a television set). The further electronic device can also be controlled by SEA 110. As shown in FIG. 2*b*, the further electronic device can be controlled by a third sound command (e.g., "Turn TV off"). It should be noted that the present invention does not impose limitations on how many SEA devices can be connected to apparatus 100 and on how many SEA devices can be controlled by SEA 110. The SEA device may be a computer, a stereo system, a telephone, a video cassette recorder, a home appliance control device, a cordless computer access device, a lighting system, or any other suitable apparatus.

As shown in FIG. 3, a second speech menu includes e.g., the first, second and third sound commands. As shall be described below, a vocal pronunciation of the exemplary first sound command and the exemplary second sound command is sufficiently distinctive. As such, SEA 110 has a high probability of differentiating a correct request. Such probability is determined using, for example, a conventional method of acoustical pattern matching ("APM").

An APM method compares the acoustical patterns of at least two sound commands provided thereto and determines an accuracy value (i.e., an indicator of how accurately can SEA 110 differentiate between the two sound commands). The accuracy value may range between, e.g., "0" and "1", where "1" represents the best possible accuracy and "0" represent the worst possible accuracy (e.g., duplicate phrases or tones). For example, the speech menu having words "should" and "could" would have a low accuracy value since acoustical patterns of these two exemplary words are very similar. On the other hand, words such as "shall" and "may" would have a high accuracy value since the acoustic patterns of these words are distinguishable. Here, the second sound command and the third sound command have similar acoustical patterns, thus the accuracy of SEA 110 is reduced.

Figure 4:
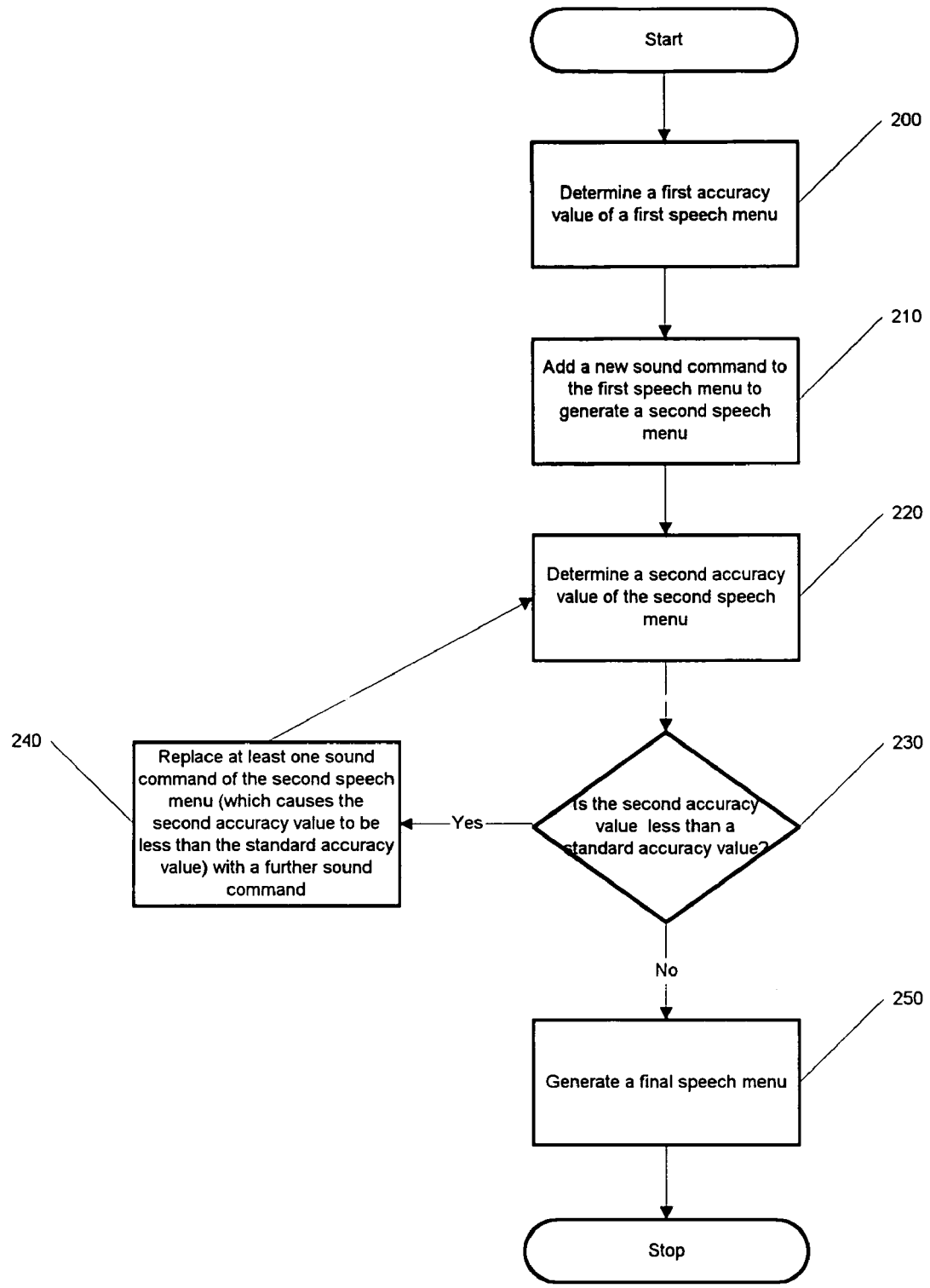
FIG. 4 shows an exemplary flow chart of the distance accuracy application according to an exemplary embodiment of the present invention.

FIG. 4 shows a flow chart illustrating an exemplary operation of DAA 120 according to an embodiment of the present invention. In step 200, DAA 120 checks the first speech menu to determine a first accuracy value between the first and second sound commands. The first accuracy value may be, for example, 0.7 if the first sound command and the second sound command do not have similar acoustical patterns.

In an alternative exemplary embodiment of the present invention, DAA 120 may also begin its operation with step 210 without any sound commands existing in the first speech menu.

After the third sound command is added to create the second speech menu (step 210), a second accuracy value is determined by analyzing acoustical patterns of the first and third sound command against acoustical pattern(s) of the second speech menu. The second accuracy value may be, e.g., 0.15 because "Turn off PC" for the first sound command and "Turn off TV" for the third sound command have similar acoustical patterns. (See step 220). In step 230, DAA 120 compares the second accuracy value to a standard (i.e., threshold) accuracy value. The standard accuracy value may be determined as a function of the first accuracy value, an average accuracy value and/or a predetermined accuracy value. The average accuracy value is determined based on average of prior accuracy values of DAA 120.

If the second accuracy value is less than the standard accuracy value then at least one sound command which causes the second accuracy value to be less than the standard accuracy value is replaced. For instance, DAA 120 may replace the third sound command with another sound command which provides similar meaning but has a different acoustical pattern. (See step 240). The third sound command may be replaced with a fourth sound command (e.g., "Turn Television off"). In another embodiment of the present invention, the user may be asked to choose which sound command would be replaced (e.g., whether to replace the first sound command and/or the third sound command).

Once again, the second accuracy value is determined for the second speech menu which now includes the fourth sound command. (See step 220). DAA 120 replaces one of the sound commands of the second speech menu until the second accuracy value is greater than or equal to the standard accuracy value.

When the second accuracy value is greater than or equal to the standard accuracy value then the second speech menu becomes a final speech menu. (See step 250). As shown in FIG. 5 the final speech menu now includes the first sound command and the fourth sound command which have sufficiently dissimilar acoustical patterns (i.e., synonyms). The third sound command is not a part of the final speech menu.

Accurate and usable SEA 110 with DAA 120, provided by the method and apparatus according to an embodiment of the present invention, can be utilized advantageously for Cordless PC Access Capability Devices. A full range of such devices can use the sound command as a primary means of communication with the user.

The method and apparatus according to an embodiment of present invention also enables a use of a broad range of SEAs to coexist on the same user interface (i.e., the top level or any other level), thus allowing the ISVs to construct the SEA which use speech centric devices, such as, e.g., Cordless PC Access Capability Devices. The ISVs are capable of executing the SEA for the electronic device without conflicting with other installed applications. Thus, a broad range of SEAs may co-exist on the same interface. For example, the user may be able to control a home automation function, a electronic device and a PC assisted telephone from the same device.

Another advantage of an embodiment of the present invention is that inter-operability between SEAs written by different ISVs is increased. Applications can be written by the ISVs that dynamically choose top level menu items depending on which items already exist. Without utilizing the present invention, one must manually construct a top level speech manager in order to prevent conflicts between SEAs.

Yet another advantage of the method and apparatus according to an embodiment of the present invention is that it allows SEAs to dynamically create the most appropriate sound commands and allows applications to support a wide variety of phrases based on the environment in which they are installed.

A further advantage of an embodiment of the present invention is that it may be used by sound centric applications to constrict and present menus to the user. The SEA may utilize this embodiment to determine the quality of the local menus and the effects of how their menus would perform when combined with other menus, for example, from the ISVs.

Another advantage of an embodiment of the present invention is that the users' perception of the accuracy of SEA is increased. Choosing the correct sound commands has a positive effect on the user regarding the accuracy of SEA. By applying DAA to the speech menus, the ISVs can easily choose sound commands that are more likely to provide accurate speech recognition.

Several embodiments of the present invention are specifically illustrated and/or described herein. However, it will be appreciated that modifications and variations of the present invention are covered by the above teachings and within the purview of the appended claims without departing from the spirit and intended scope of the present invention.

What is claimed is:

1. A method of building a speech menu to control at least two devices, comprising:
   identifying at least two devices, each device having at least one candidate audio command associated with it,
   comparing each of the candidate audio commands of each device with previously registered audio commands to develop an accuracy value, and
   adding to the speech menu those candidate audio commands for which associated accuracy values exceed a predetermined value, wherein the predetermined value is a function of at least one of the accuracy value, a predetermined threshold value and an average accuracy value, the average accuracy value being determined as a function of an average of a plurality of prior accuracy values.

2. A method of building a speech menu to control at least two devices, comprising:
   identifying at least two devices, each device having at least one candidate audio command associated with it,
   comparing each of the candidate audio commands of each device with previously registered audio commands to develop an accuracy value, and
   adding to the speech menu those candidate audio commands for which associated accuracy values exceed a predetermined value, wherein the accuracy value is determined according to an acoustical pattern matching procedure.

3. A set of instructions residing in a storage medium, the set of instructions capable of being executed by a processor to implement a development of a speech menu for a speech-enabled application, the method comprising the steps of:
   a) comparing candidate sound commands from at least two device predetermined tables to previously-stored sound commands to determine an accuracy value therebetween; and
   if the accuracy values each are less than a predetermined value, installing the candidate sound commands of each device in the speech menu.

4. The set of instructions according to claim 3, wherein the predetermined value is a function of at least one of the accuracy value, a predetermined threshold value and an average accuracy value, the average accuracy value being determined as a function of an average of a plurality of prior accuracy values.

5. The set of instructions according to claim 3, wherein the accuracy value is determined using an acoustical pattern matching procedure.

6. The set of instructions according to claim 3, wherein the candidate sound command includes at least one of a word, a phrase and at least one tone.

7. A method for building a speech menu from separate pre-existing speech menus, comprising:
   determining a similarity of at least two predetermined and pre-trained audio commands from the pre-existing speech menus by comparing each audio command to the others, to determine an accuracy value; and
   combining each of the at least two audio commands in a final speech menu, wherein the accuracy value for each audio command is greater than or equal to a predetermined value.

8. The method of claim 7, wherein the predetermined value is a function of at least one of the accuracy value, a predetermine threshold value and an average accuracy value, the average accuracy value being determined as a function of an average of a plurality of prior accuracy values.

9. The method of claim 7, wherein each accuracy value is determined according to an acoustical matching procedure.

10. The method of claim 7, wherein an execution command is associated with any audio command in the final speech menu.

11. The method of claim 7, wherein the candidate audio commands are selected from speech, tones, or combinations thereof.

12. The method of claim 7, wherein the determining and combining occur automatically, without user intervention.

13. A speech-enabled apparatus comprising:
   a distance accuracy module capable of determining the similarity of at least two pre-trained audio commands, each pre-trained audio command being selected from a pre-existing speech menu, and capable of installing each pre-trained audio command into a final speech menu unless an accuracy value for each audio command is less than a predetermined value.

14. The speech-enabled apparatus according to claim 13, wherein the speech-enabled apparatus includes a computer.

15. The speech-enabled apparatus according to claim 13, wherein the speech-enabled apparatus is coupled to at least one device using at least one of a serial connection, a parallel connection, a dedicated card connection, an internet connection, a wireless connection, or combinations thereof.

16. The speech-enabled apparatus according to claim 13, wherein the at least one device includes at least one of a computer, a stereo system, a telephone, a VCR, a home appliance control device, a cordless computer access device, a lighting system, or combinations thereof.

17. A set of instructions residing in a storage medium, the set of instructions capable of being executed by a processor to implement development of a speech menu, the method comprising the steps of:
   a) determining a similarity of at least two pre-trained audio commands from pre-existing speech menus by comparing each audio command to the others to determine an accuracy value for each audio; and
   b) combining each of the at least two audio commands in a final speech menu, wherein the accuracy value for each audio command is greater than or equal to a predetermined value.

18. The set of instructions according to claim 17, wherein the predetermined value is a function of at least one of the accuracy value, a predetermined threshold value and an average accuracy value, the average accuracy value being determined as a function of an average of a plurality of prior accuracy values.

* * * * *